US006773759B2

(12) United States Patent
Kobayashi et al.

(10) Patent No.: US 6,773,759 B2
(45) Date of Patent: Aug. 10, 2004

(54) METHOD FOR FORMING MULTI-LAYER COATING FILM

(75) Inventors: Yoshiko Kobayashi, Toyota (JP); Susumu Umemura, Toyota (JP); Kenta Shimizu, Miyoshi-cho (JP); Yasushi Nakao, Miyochi-cho (JP); Shigeru Nakamura, Miyoshi-cho (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 10/031,172

(22) PCT Filed: May 18, 2001

(86) PCT No.: PCT/JP01/04178

§ 371 (c)(1),
(2), (4) Date: Jan. 17, 2002

(87) PCT Pub. No.: WO01/87502

PCT Pub. Date: Nov. 22, 2001

(65) Prior Publication Data

US 2002/0136837 A1 Sep. 26, 2002

(30) Foreign Application Priority Data

May 18, 2000 (JP) ....................................... 2000-146096

(51) Int. Cl.[7] .............................. B05D 1/36; B32B 9/04
(52) U.S. Cl. .................. 427/407.1; 427/409; 428/411.1
(58) Field of Search .............................. 427/407.1, 409; 428/411.1

(56) References Cited

U.S. PATENT DOCUMENTS 3,102,856 A * 9/1963 Chase ........................ 209/166
3,684,197 A * 8/1972 Ashton et al. ................ 241/26
4,450,200 A 5/1984 Iwato et al. ................ 428/323
5,475,049 A * 12/1995 Ohtomo et al. ............. 524/449
5,648,408 A * 7/1997 Babler ........................ 523/333
6,428,856 B1 * 8/2002 Masuda et al. .......... 427/412.3

FOREIGN PATENT DOCUMENTS

EP 0 379 746 A2 8/1990
EP 0 507 634 A1 10/1992
JP 52-43817 4/1977
JP 52-043817 4/1977
JP 55-56165 4/1980
JP 55-056165 4/1980
JP 64-85260 3/1989
JP 10-231454 9/1998
JP 11-147069 6/1999

* cited by examiner

*Primary Examiner*—Elena Tsoy
(74) *Attorney, Agent, or Firm*—Wenderoth, Lind & Ponack, LLP

(57) ABSTRACT

This invention relates to a process for forming a multi-layer coating film by applying, to a substrate, intermediate paint, metallic paint and clear paint by 3C1B method, which process is characterized in that said intermediate paint contains 0.5 to 5 phr of flat talc powder of a size of 0.5 to 10 $\mu$m in longer direction and 0.01 to 1 $\mu$m in thickness, and has a total pigment content of 40 to 100 phr.

7 Claims, No Drawings

METHOD FOR FORMING MULTI-LAYER COATING FILM

TECHNICAL FIELD

This invention relates to a process for forming a multi-layer coating film which comprises an intermediate coating film, a metallic coating film and a clear coating film, and which has chipping-resistance and smoothness improved.

BACKGROUND ART

It has already been known to form, on exterior surfaces of automobile body etc., a multi-layer coating film by 3C1B method, i.e., by applying intermediate paint, metallic paint and clear paint in this order, and curing the resultant coatings simultaneously by heating. It is often seen that this multi-layer coating film is hit by gravels spattered by a running car, and thus partially peels off (which phenomenon is called "chipping"). In order to resolve this chipping, it has been proposed to place flexible coating film between coating film layers. This method is, however, undesirable since it increases the number of coating process steps.

The objective of this invention is to improve, without increasing the number of coating process steps, the chipping-resistance of a multi-layer coating film which is formed by 3C1B method with use of intermediate paint, metallic paint and clear paint.

DISCLOSURE OF INVENTION

As a result of assiduous study, the inventors of this invention have now found out that the above-mentioned objective is achieved when the intermediate paint contains 0.5 to 5 phr of flat talc powder of a specific size and has a total pigment content of 40 to 100 phr, and, thus, the inventors have completed this invention.

This invention relates to a process for forming a multi-layer coating film by applying, to a substrate, intermediate paint, metallic paint and clear paint by 3C1B method, which process is characterized in that said intermediate paint contains 0.5 to 5 phr of flat talc powder of a size of 0.5 to 10 $\mu$m in longer direction and 0.01 to 1 $\mu$m in thickness, and has a total pigment content of 40 to 100 phr.

In the following, the process of this invention for forming a multi-layer coating film is explained in more detail.

MODES FOR CARRYING OUT INVENTION

The characteristic feature of this invention resides in the use of intermediate paint which contains 0.5 to 5 phr of flat talc powder of a size of 0.5 to 10 $\mu$m in longer direction and 0.01 to 1 $\mu$m in thickness, and which has a total pigment content of 40 to 100 phr. Owing to this characteristic feature, a multi-layer coating film has successfully been improved in both chipping-resistance and smoothness without increase in the number of coating process steps.

Concrete examples of the intermediate paint which is used in this invention may include organic solvent type or aqueous type liquid paint which is obtained by mixing, with organic solvent and/or water, a base resin such as polyester resin, alkyd resin and acrylic resin having a crosslinking functional group such as hydroxyl group; a crosslinking agent such as melamine resin and blocked polyisocyanate compound; and flat talc of a specific size; and other pigments. Said other pigments include coloring pigments and extender pigments other than flat talc. The size (particle diameter) of these other pigments is suitably equivalent to, or less than, the size of the above-mentioned flat talc powder.

In this specification, "phr" is an abbreviation of "part per hundred parts of resin", which means part(s) by weight per 100 parts by weight of resin solid content of paint.

The flat talc powder which is used in this invention is an inorganic extender pigment having hydrous magnesium silicate as a main component. Said powder are flakes of a size of 0.5 to 10 $\mu$m, preferably 1 to 5 $\mu$m, in longer direction, and 0.01 to 1 $\mu$m, preferably 0.1 to 0.5 $\mu$m, in thickness. When the size in longer direction of the flat talc powder used is smaller than 0.5 $\mu$m, the chipping resistance of coating film decreases, while, when it is larger than 10 $\mu$m, the smoothness of coating film decreases, both of which are undesirable. When talc is replaced by a powder of clay, barium sulfate or mica, it becomes impossible to achieve the object of this invention to simultaneously improve the chipping resistance and smoothness of a multi-layer coating film.

The content of flat talc powder in intermediate paint may be in a range of 0.5 to 5 parts by weight per 100 parts by weight of resin solid content of paint (i.e., 0.5 to 5 phr), preferably 1 to 4 parts by weight (1 to 4 phr). When said content is lower than 0.5 part by weight, the chipping resistance of coating film is not improved, while, when it is higher than 5 parts by weight, the smoothness of coating film decreases, both of which are undesirable.

As other pigments to be compounded in intermediate paint together with flat talc powder, any known coloring pigments and extender pigments which are usually used in intermediate paint are usable. As for the content of said other pigments, the total content of flat talc powder and such other pigments, i.e., "total pigment content", may be 40 to 100 phr, preferably 60 to 97 phr, especially desirably 80 to 95 phr. When said total pigment content in intermediate paint used is lower than 40 phr, the chipping resistance of coating film decreases, while, when it is larger than 100 phr, the multi-layer film becomes mechanically brittle, both of which are undesirable.

This intermediate paint may be applied on a metal-made or plastic-made substrate for automobile body on which an under coating such as cationic electrodeposition paint has been applied as circumstances may demand. Paint application may be conducted by any known method. The thickness of coating film of this intermediate paint is suitably 15 to 40 $\mu$m, in particular 20 to 35 $\mu$m, as a cured film.

Subsequently, while intermediate coating film is kept uncured, this uncured intermediate coating surface is coated with metallic paint.

Any known metallic paint is usable, examples of which include usual thermosetting metallic paint which is obtained by mixing, with organic solvent and/or water, a base resin such as polyester resin, alkyd resin and acrylic resin having a crosslinking functional group such as hydroxyl group; a crosslinking agent such as melamine resin and blocked polyisocyanate compound, a metallic pigment such as aluminum flake and titanium oxide-coated mica; and, furthermore, a coloring pigment and an extender pigment as circumstances may demand. Metallic paint is applied by a usual method on the above-mentioned uncured coating surface of intermediate paint. The thickness of coating film of this metallic paint is suitably 10 to 40 $\mu$m, preferably 15 to 35 $\mu$m, as a cured film.

Subsequently, while the coating film of this metallic paint is kept uncured, clear paint is further applied.

Any known clear paint which forms colorless or colored transparent coating film is usable, examples of which include usual thermosetting clear paint which is obtained by mixing, with organic solvent, a base resin such as polyester resin, alkyd resin and acrylic resin having a crosslinking functional group such as hydroxyl group; a crosslinking agent such as melamine resin and blocked polyisocyanate compound; and, furthermore, as circumstances may demand, a coloring pigment or an extender pigment which does not substantially interfere with the transparency of coating film. Clear paint is applied by a usual method on the above-mentioned uncured coating surface of metallic paint. The thickness of coating film of this clear paint is generally 20 to 80 μm, preferably 25 to 50 μm, as a cured film.

When intermediate paint, metallic paint and clear paint are applied in order in this manner to form an uncured three-layer coating film, and when the three layers of coating film are simultaneously cured by heating at a temperature of about 100 to about 180° C., in particular at about 120 to about 160° C., for about 10 to 40 minutes, a multi-layer coating film as an object of this invention is formed.

According to the afore-mentioned process of this invention, there is formed, without increase in the number of process steps, a multi-layer coating film which is excellent in both chipping resistance and smoothness, by 3C1B method with use of intermediate paint, metallic paint and clear paint, said intermediate paint containing 0.5 to 5 phr of flat talc powder of a size of 0.5 to 10 μm in longer direction and 0.01 to 1 μm in thickness, and having a total pigment content of 40 to 100 phr.

EXAMPLES

In the following, this invention is explained in more detail by means of Examples and Comparative Examples. Both part and % are on weight basis, and the thickness of coating film is that of cured coating film.

Example 1

A steel plate which had been coated with cationic electrodeposition paint and then heat-cured was coated with polyester resin•melamine resin-type intermediate paint [containing, in an organic solvent, 3 phr of flat talc of a size of 5 μm in longer direction and 0.5 μm in thickness, 80 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was excellent in both chipping resistance and smoothness (sense of gloss).

Comparative Example 1

A multi-layer coating film was formed by the same operation as in Example 1 except that flat talc was not compounded in intermediate paint. Thus obtained multi-layer film was equivalent to that of Example 1 in smoothness, but was inferior thereto in chipping resistance.

Comparative Example 2

A steel plate which had been coated with cationic electrodeposition paint and then heat-cured was coated with polyester resin•melamine resin-type intermediate paint [containing, in an organic solvent, 3 phr of clay (particle size: 0.1 to 2 μm), 80 phr of titanium white (particle size: 0.2

μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was equivalent to that of Example 1 in smoothness, but was inferior thereto in chipping resistance.

Comparative Example 3

A steel plate which had been coated with cationic electrodeposition paint and then heat-cured was coated with polyester resin•melamine resin-type intermediate paint [containing, in an organic solvent, 3 phr of barium sulfate (particle size: 0.1 to 2 μm), 80 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was equivalent to that of Example 1 in smoothness, but was inferior thereto in chipping resistance.

Comparative Example 4

A steel plate which had been coated with cationic electrodeposition paint and then heat-cured was coated with polyester resin•melamine resin-type intermediate paint [containing, in an organic solvent, 3 phr of flat mica (5 μm in longer direction, and 0.5 μm in thickness), 80 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was inferior to that of Example 1 in both smoothness and chipping resistance.

Comparative Example 5

A steel plate which had been coated with cationic electrodeposition paint and then heat-cured was coated with polyester resin•melamine resin-type intermediate paint [containing, in an organic solvent, 3 phr of flat talc of a size of 15 μm in longer direction and 0.5 μm in thickness, 80 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was almost equivalent to that of Example 1 in chipping resistance, but was inferior thereto in smoothness.

Comparative Example 6

A steel plate which had been coated with cationic electrodeposition paint and then heat-cured was coated with polyester resin•melamine resin-type intermediate paint [containing, in an organic solvent, 3 phr of flat talc of a size of 5 μm in longer direction and 0.5 μm in thickness, 30 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was inferior to that of Example 1 in chipping resistance.

Comparative Example 7

A steel plate which had been coated with cationic electrodeposition paint and then heat-cured was coated with polyester resin•melamine resin-type intermediate paint [containing, in an organic solvent, 3 phr of flat talc of a size of 5 μm in longer direction and 0.5 μm in thickness, 106 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was inferior to that of Example 1 in smoothness and chipping resistance.

Comparative Example 8

A steel plate which had been coated with cationic electrodeposition paint and then heat-cured was coated with polyester resin•melamine resin-type intermediate paint [containing, in an organic solvent, 20 phr of flat talc of a size of 5 μm in longer direction and 0.5 μm in thickness, 75 phr of titanium white (particle size: 0.2 μm) and 1 phr of carbon black (particle size: 0.1 μm)] to a film thickness of 30 μm. After left still for two minutes at a room temperature, thus coated steel plate was further coated with thermosetting acrylic resin type metallic paint (film thickness: 15 μm) and thermosetting acrylic resin type clear paint (film thickness: 40 μm) in order, and, thereafter, thus applied three layers of coating film were heated at 140° C. for 30 minutes and were thereby simultaneously cured. Thus obtained multi-layer coating film was almost equivalent to that of Example 1 in chipping resistance, but was inferior thereto in smoothness.

Coating Film Property Test

The multi-layer coating films which had been formed in the above-mentioned Example 1 and Comparative Examples 1 to 8 were measured for chipping resistance and coating surface smoothness by the following method. Results are shown in Table below.

Chipping Resistance:

There was sprayed about 500 ml of marble having a diameter of 15 to 20 mm on the surface of multi-layer coating film at an incident angle of 45 degrees, at an air-spray pressure of about 4 $kg/cm^2$ and an ambient temperature of −20° C., by using Q-G-R Gravelometer (trademark of a product manufactured by Q Panel Co.), and, then, the coating surface was visually observed. ○ means that, whereas intermediate coating film had slightly peeled off, electrodeposition coating film had hardly peeled off. Δ means that, intermediate coating film had much peeled off, and that electrodeposition coating film had partially peeled off. X means that almost all intermediate coating film had peeled off, and that electrodeposition coating film had much peeled off.

Coating Surface Smoothness:

With use of a specular glossmeter, reflectance was measured when both incident angle and received angle were 20 degrees, and, thus, the degree of smoothness was examined. The higher the reflectance is, the better is smoothness.

| | Example | Comparative Example | | | | | | | |
|---|---|---|---|---|---|---|---|---|---|
| | 1 | 1 | 2 | 3 | 4 | 5 | 6 | 7 | 8 |
| Chipping resistance | ○ | X | X | X | Δ | ○ | Δ | Δ | ○ |
| Coating surface smoothness | 85 | 90 | 85 | 85 | 60 | 30 | 90 | 75 | 10 |

What is claimed is:

1. A process for forming a multi-layer coating film by applying, to a substrate, intermediate paint, metallic paint and clear paint by 3C1B method, wherein said intermediate paint contains 0.5 to 5 phr of talc powder, said talc powder consisting essentially of flat talc powder of a size of 0.5 to 10 μm in longer direction and 0.01 to 1 μm in thickness, and has a total pigment content of 40 to 100 phr.

2. A process of claim 1 wherein the flat talc powder is of a size of 1 to 5 μm in longer direction.

3. A process of claim 1 wherein the flat talc powder is of a size of 0.1 to 0.5 μm in thickness.

4. A process of claim 1 wherein the flat talc powder is contained in an amount of 1 to 4 phr.

5. A process of claim 1 wherein total pigment content is 80 to 95 phr.

6. A process of claim 1 wherein the substrate is a metal-made or plastic-made substrate for automobile body which has been coated with cationic electrodeposition paint as an under coating.

7. Articles which have been coated by the process of claim 1.

* * * * *